Feb. 15, 1966 G. O. K. SCHNEIDER 3,235,665

SHORTCUT ROUTING CIRCUITRY

Filed June 27, 1962

2 Sheets-Sheet 1

INVENTOR.
GERHARD O.K. SCHNEIDER
BY
Robert L. Nathans
ATTORNEY

Feb. 15, 1966 G. O. K. SCHNEIDER 3,235,665

SHORTCUT ROUTING CIRCUITRY

Filed June 27, 1962 2 Sheets-Sheet 2

United States Patent Office 3,235,665

Patented Feb. 15, 1966

3,235,665

SHORTCUT ROUTING CIRCUITRY

Gerhard O. K. Schneider, Rochester, N.Y., assignor, by mesne assignments, to Stromberg Carlson Corporation, Rochester, N.Y., a corporation of Delaware Filed June 27, 1962, Ser. No. 205,581
3 Claims. (Cl. 179—18)

The present invention relates to shortcut routing circuitry.

Occasionally a subscriber associated with a first local telephone switchboard erroneously dials a nine, or other designation, to seize a long distance switchboard where the called party is, in fact, associated with one of a number of local switchboards. Tying up a long distance switchboard for the duration of the call under these circumstances is expensive and undesirable.

Accordingly, it is the principal object of the present invention to provide a new and improved shortcut routing circuit.

A further object of the present invention is to provide a new and improved shortcut routing circuit which automatically routes a local call from a switchboard associated with a calling party to one of a number of local switchboards associated with the called party regardless of whether or not the calling party seizes a long distance switchboard by dialing a nine or the like.

Further objects and advantages of the invention will become apparent as the following description proceeds, and the features of novelty which characterize the invention will be pointed out with particularity in the claims annexed to and forming a part of this specification.

Figure 1:
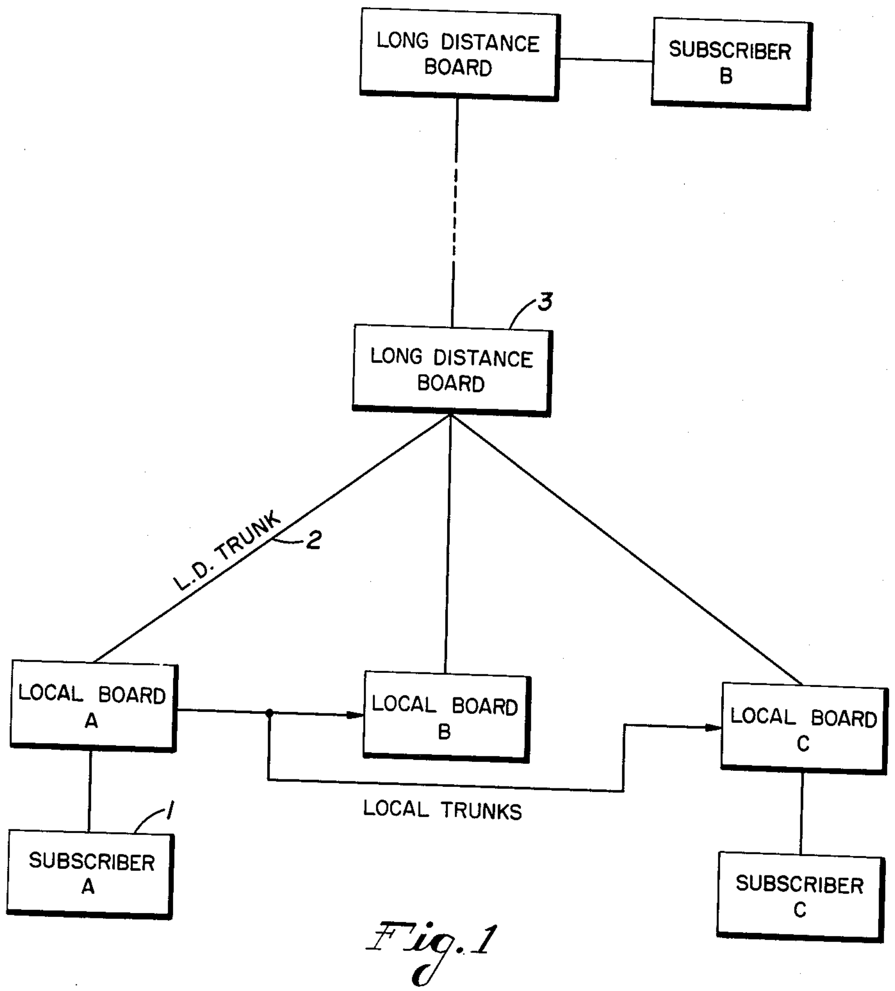
Figure 2:
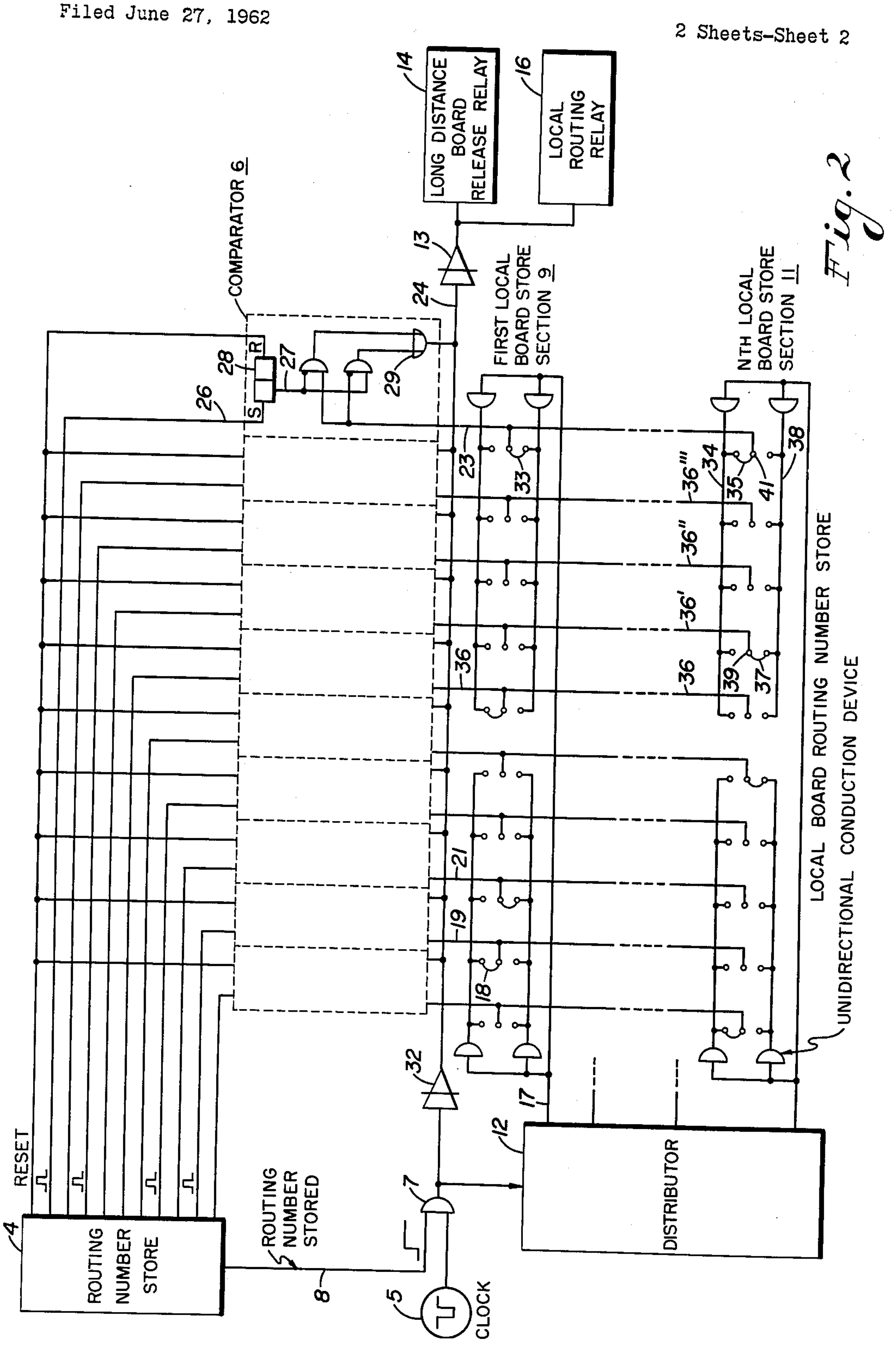

For a better understanding of the invention, reference may be had to the accompanying drawings in which:

FIG. 1 schematically discloses the overall operating environment of the present invention; and FIG. 2 discloses a preferred embodiment of the present invention.

In FIG. 1, block 1 symbolizes a subscriber station of a calling party associated with local switchboard A. Let it be assumed that subscriber A wishes to place a long distance call to subscriber B. Subscriber A dials a nine, or the like, to seize long distance trunk pair 2, which couples long distance board 3 to local switchboard A. Subscriber A thereafter dials the remaining portion of subscriber B's number, thereby to complete the call. Now let it be assumed that subscriber A wishes to call subscriber C, whose subscriber station is associated with local switchboard C. Subscriber A, however, is not aware of the fact that subscriber C is associated with a local switchboard but erroneously dials a nine, or the like, to seize long distance trunk 2. The routing circuitry of the present invention prevents the tying up of the long distance switchboard for the duration of the call under these circumstances. Circuitry is provided for storing the routing digits of the local switchboards within local switchboard A. If subscriber A dials a local routing number, this number will be stored and sequentially compared with the local routing numbers stored within local switchboard A. If the sequential comparison process reveals that subscriber A has, in fact, dialed a local routing number, means are provided for releasing the seized long distance switchboard. Local routing thereafter takes place. A novel local switchboard routing number store is employed within each local switchboard for the storage of the routing numbers of all other local switchboards. This routing number store is extremely simple and inexpensive to fabricate compared to prior art stores.

Referring now to FIG. 2, which discloses a preferred embodiment of the present invention, a conventional two-digit routing number store 4 is disclosed, coupled to comparator 6. It should be understood that the circuitry of FIG. 2 is contained within each local switchboard so as to prevent calling parties associated with each switchboard from erroneously setting up calls through long distance switchboards where local calls are, in fact, being placed. The two-digit routing number stored within routing number store 4 is applied to comparator 6 by means of a two-out-of-five code. After the routing number is inserted into store 4, a ground or mark is applied to a first terminal of AND gate 7 over conductor 8 as long as the number is stored in store 4. A first local switchboard routing number store section 9 and an *n*th local switchboard routing number store section 11 are coupled to comparator 6, as shown. A distributor 12 is also coupled to local routing number store sections 9 and 11, as shown, to cause the routing numbers stored within the routing number store to be sequentially applied to comparator 6. When and if a comparison is positive, a mark will be produced by inverter 13, thereby to actuate long distance switchboard release relay 14 and actuate local routing relay 16, which relays remain actuated owing to conventional latching contacts associated therewith.

Just after conductor 8 is marked, a mark will be produced by clock 5 to produce a mark at the output terminal of AND gate 7 which in turn causes distributor 12 to impress a mark on conductor 17. Since terminal pair 18 is bridged by an encoding strap or conductor, a mark will be impressed on conductor 19 and, in like manner, a mark will be impressed on conductors 21, 23 and 36. Accordingly, the two-digit routing number, which identifies the first local switchboard, is applied to comparator 6 by means of a two-out-of-five code. It should be understood, however, that the particular code employed is strictly a matter of choice. In the event that a disparity exists between one or more of the ten bits applied to comparator 6, a mark will be applied to conductor 24, thereby preventing the actuation of the long distance switchboard release relay owing to the presence of inverter 13. However, should parity exist at each and every stage of comparator 6, a no-mark condition will exist on conductor 24 and the action of inverter 13 will cause the release of the long distance switchboard and local routing will thereafter take place.

After the first comparison takes place, the next ground going clock pulse passes through AND gate 7 and distributor 12 is stepped, thereby to cause the routing number associated with a second local switchboard to be applied to comparator 6 in the same manner as described herein above in connection with the routing number within first local switchboard store section 9. The distributor is thereafter stepped again until all of the routing numbers associated with each local switchboard are compared with the routing number stored within routing number store 4.

Comparator 6 may be any conventional high-speed digital comparator. Each stage of the comparator may include a pair of inhibit gates coupled to output conductor 24 through an OR gate, as shown. It may be readily observed that, if a mark is applied to conductor 26, a mark will be applied to output terminal 27 of flip-flop 28. Should a mark be simultaneously applied to conductor 23, both inhibit gates are inhibited and a no-mark condition is produced at the output terminal of OR gate 29. Should a no-mark condition be applied to both inputs, a no-mark condition will also be produced at the output terminal of OR gate 29 since marks are not applied to the inhibitors at all. It should also be observed that if disparity exists so that a mark is applied to one input of the comparator stage, but no-mark is applied to the other input of the comparator stage, a mark will pass through one of the inhibitors, thereby to impress a mark condition on conductor 24. Therefore, it should be apparent that if disparity exists at one stage of comparator 6, a mark condition will be produced on conductor 24, thereby to prevent the release of the long distance switchboard coupled to the switchboard containing the circuitry of FIG. 2.

It should be particularly noted that although the plurality of local switchboard routing number stores are connected in parallel, complete isolation exists between each store. In other words, the mark which is produced on conductor 17, and which is applied to conductor 23 owing to the presence of strap 33, may be impressed on upper lead 34 by virtue of strap 35. However, upper lead 34 is not coupled to any of the leads 36 since the second strap 37 will not be connected to upper lead 34 but will, on the contrary, be connected to the lower lead 38. In other words, the lower conductor within each store section, such as conductor 38, will be connected to only one central terminal, such as terminal 39, and the upper conductor within each store, such as upper lead 34, will be connected to one central terminal only, such as terminal 41. In the absence of this arrangement, a mark condition impressed upon conductor 23 by virtue of strap 33 will pass through strap 35 and second strap 37 which would erroneously apply an additional mark to conductor 36'. In other words, in the absence of the "two-pier-per-store" arrangement of the present invention, strap 37 will be coupled to upper lead 34 to erroneously cause a mark to be applied to conductor 36'. Although this problem could conceivably be alleviated without the "two-pier-per-store" arrangement through the use of diodes at each crosspoint, the increased reliability and savings are considerable where hundreds of crosspoints are involved.

If a three-out-of-seven code were stored, the circuitry would be expanded to a "three-tier-per-store" arrangement.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a telephone system, a local switchboard, a plurality of *n* switchboards on the same level as said local switchboard, *n* being an integer, a central switchboard, a trunk circuit coupling said local switchboard to said central switchboard, a subscribed station coupled to said local switchboard, means within said subscriber station for transmitting directive information capable of seizing said central switchboard and switching said station through said local switchboard and said trunk to said central switchboard, first means for storing a routing number which is included in said directive information and which is transmitted from said subscriber station, second means for storing the routing number assigned to said local switchboard and to each of said *n* switchboards, means for sequentially comparing the routing number stored within said first means for storing with each of the routing numbers stored within said second means, and means for releasing said central switchboard if seized by said subscriber station where said routing number stored within said first means is equal to a routing number stored within said second means regardless of whatever directive information is in fact transmitted from said subscriber station.

2. In a telephone system, a local switchboard, a plurality of *n* switchboards on the same level as said local switchboard, *n* being an integer, a central switchboard, a trunk circuit coupling said switchboard to said central switchboard, a subscriber station coupled to said local switchboard, means within said subscriber station for transmitting directive information capable of seizing said central switchboard and switching said station through said local switchboard and said trunk to said central switchboard, first means for storing a routing number which is included in said directive information and which is transmitted from said subscriber station, second means for storing the routing number assigned to said local switchboard and to each of said *n* switchboards, said second means including: a group of vertical conductors, a first and second group of horizontal conductors, bidirectional conduction means for coupling each conductor of said first and second groups of horizontal conductors to only one of said vertical conductors, means for sequentially comparing the routing number stored within said first means for storing with each of the routing numbers stored within said second means, and means for releasing said central switchboard if seized by said subscriber station where said routing number stored within said first means is equal to a routing number stored within said second means regardless of whatever directive information is in fact transmitted from said subscriber station.

3. In a telephone system, a local switchboard, a plurality of *n* switchboards on the same level as said local switchboard, *n* being an integer, a central switchboard, a trunk circuit coupling said local switchboard to said central switchboard, a subscriber station coupled to said local switchboard, means within said subscriber station for transmitting directive information capable of seizing said central switchboard and switching said station through said local switchboard and said trunk to said central switchboard, first means for storing a routing number which is included in said directive information and which is transmitted from said subscriber station, second means for storing the routing number assigned to said local switchboards and to each of said *n* switchboards, said second means including: a group of vertical conductors, a first and second group of horizontal conductors, bidirectional conduction means for coupling each conductor of said first and second groups of horizontal conductors to only of said veritcal conductors, means for comparing the routing number stored within said first means for storing with each of the routing numbers stored within said second means, and means for releasing said central switchboard if seized by said subscriber station where said routing number stored within said first means is equal to a routing number stored within said second means regardless of whatever directive information is in fact transmitted from said subscriber station.

References Cited by the Examiner

UNITED STATES PATENTS

| | | | |
|---|---|---|---|
| 1,636,648 | 7/1927 | Ray | 179—18 |
| 1,854,106 | 4/1932 | Carpenter | 179—18 |
| 2,468,300 | 4/1949 | Maloney et al. | 179—18 |
| 3,003,143 | 10/1961 | Beurrier | 340—166 X |
| 3,120,581 | 2/1964 | Brooks et al. | 179—18 |
| 3,128,347 | 4/1964 | Drake et al. | 179—18 |

ROBERT H. ROSE, *Primary Examiner.*